(12) United States Patent
Otsuka et al.

(10) Patent No.: US 10,051,915 B2
(45) Date of Patent: Aug. 21, 2018

(54) FOAMED SOLE AND SHOE

(75) Inventors: Yasuhiro Otsuka, Kobe (JP); Kenichi Harano, Kobe (JP); Takuro Kamimura, Kobe (JP); Daisuke Sawada, Kobe (JP)

(73) Assignee: ASICS Corporation (JP)

( * ) Notice: Subject to any disclaimer, the term of this patent is extended or adjusted under 35 U.S.C. 154(b) by 62 days.

(21) Appl. No.: 14/373,002

(22) PCT Filed: Jan. 18, 2012

(86) PCT No.: PCT/JP2012/050934
§ 371 (c)(1),
(2), (4) Date: Jul. 17, 2014

(87) PCT Pub. No.: WO2013/108378
PCT Pub. Date: Jul. 25, 2013

(65) Prior Publication Data
US 2015/0181975 A1  Jul. 2, 2015

(51) Int. Cl.
*A43B 13/18* (2006.01)
*A43B 13/04* (2006.01)
*A43B 13/12* (2006.01)

(52) U.S. Cl.
CPC ............ *A43B 13/187* (2013.01); *A43B 13/04* (2013.01); *A43B 13/12* (2013.01)

(58) Field of Classification Search
CPC .......... A43B 13/187; C08J 9/0061; C08J 9/06
See application file for complete search history.

(56) References Cited

U.S. PATENT DOCUMENTS

| 5,948,503 | A  | * | 9/1999 | Yamamoto | C08L 7/00 264/109 |
| 6,372,809 | B1 | * | 4/2002 | Asai | C08J 9/28 521/184 |
| 2008/0229622 | A1 | * | 9/2008 | Mori | A43B 13/04 36/25 R |
| 2009/0239965 | A1 | * | 9/2009 | Wada | A43B 13/04 521/150 |

(Continued)

FOREIGN PATENT DOCUMENTS

| EP | 483863 | A2 | 5/1992 |
| EP | 1880625 | A1 | 1/2008 |

(Continued)

OTHER PUBLICATIONS

International Publication with International Search Report of PCT/JP2012/050934 filed Jan. 18, 2012.

(Continued)

*Primary Examiner* — Hai Vo
(74) *Attorney, Agent, or Firm* — Katten Muchin Rosenman LLP

(57) ABSTRACT

A foamed sole according to the present invention includes a foam molding containing a rubber component and a resin component, wherein the maximum value of a loss factor [tan δ] at a frequency of 10 Hz and at 30° C. to 80° C. of the foam molding is 0.18 or less, and a peak of a loss factor [tan δ] at a frequency of 10 Hz of the foam molding lies within the range of 100° C. or higher. The foamed sole has a feature that it hardly shrinks when it is heated.

12 Claims, 2 Drawing Sheets

(56) References Cited

U.S. PATENT DOCUMENTS

| | | | |
|---|---|---|---|
| 2010/0069596 A1* | 3/2010 | Kimishima | B01D 67/002 526/352 |
| 2011/0210486 A1* | 9/2011 | Agarwal | B32B 25/04 267/122 |
| 2015/0143723 A1 | 5/2015 | Tateishi et al. | |

FOREIGN PATENT DOCUMENTS

| | | |
|---|---|---|
| EP | 2045287 A1 | 4/2009 |
| JP | 2000198898 A | 7/2000 |
| JP | 2008163144 A | 7/2008 |
| WO | WO-2008013060 A1 | 1/2008 |

OTHER PUBLICATIONS

European Search Report for European Patent Application No. EP 12866130.3-1655, dated Sep. 22, 2015.

* cited by examiner

FOAMED SOLE AND SHOE

RELATED APPLICATION

This application is a national stage application filed under 35 U.S.C. 371, of International Application No. PCT/JP2012/050934, filed Jan. 18, 2012, the contents of which are hereby fully incorporated by reference.

TECHNICAL FIELD

The present invention relates to a foamed sole for a shoe and a shoe.

BACKGROUND ART

Various shoes such as sports shoes are provided with soles.

The soles can be roughly divided into a non-foamed sole made of a non-foamed molding formed into a prescribed shape and a foamed sole made of a foam molding formed into a prescribed shape.

A shoe provided with the foamed sole is lighter in weight than a shoe provided with the non-foamed sole, and is excellent in wearing impression.

The shoe provided with a foamed sole is produced by adhering a foamed sole formed into a prescribed shape to the lower surface of a shoe body.

For example, the foamed sole is adhered to a shoe body with a solvent-type adhesive. In this case, in order to solidify the solvent-type adhesive, a hot air drying treatment is performed at a prescribed temperature (e.g. 60° C. to 80° C.). The foamed sole is heated, and then, the foamed sole shrinks and the dimensions of the foamed sole vary. Such a foamed sole in which a dimensional change is generated has a problem that the foamed sole cannot adhere to a prescribed position of the shoe body with precision.

In particular, the more the expansion ratio of a foam molding is increased (that is, the more the density of a foam molding is reduced), the more the rubber component is greatly stretched on molding, and therefore, thermal shrinkage of the foamed sole is liable to be generated at the time of the heat treatment. On the other hand, although the thermal shrinkage is hardly generated when the expansion ratio of a foam molding is reduced, such a foamed sole is relatively heavy in weight and is poor in wearing impression.

Patent Document 1 discloses a foamable rubber composition for a shoe sole prepared by blending a polymer component composed of 10 to 90% by mass of a vinyl-cis-polybutadiene rubber (A) containing 1,4-cis-polybutadiene (a) and a 1,2-polybutadiene crystalline fiber (b) having a prescribed shape and a melting point of 170° C. or higher, 10 to 50% by mass of a diene-based rubber (B) other than the rubber (A), and 2 to 50% by mass of a thermoplastic polymer (C); and 2 to 50 parts by mass of a rubber-reinforcing agent (D) relative to 100 parts by mass of the polymer component.

Patent Document 1 discloses various effects such as "the rubber composition for a shoe sole is light in weight and has a moderate hardness, is excellent in tensile strength, tear strength, abrasion resistance, and gripping property, and is also excellent in dimensional stability after foaming."

However, from the description in Patent Document 1, it is not clear what kind of action is exerted to obtain a foam molding excellent in dimensional stability after foaming in the case of using the rubber composition for a shoe sole.

Moreover, Patent Document 1 does not disclose nor suggest about thermal shrinkage of a foam molding.
[Patent Document]
[Patent Document 1] WO 2008/013060

A first object of the present invention is to provide a foamed sole which hardly shrinks when it is heated and a shoe prepared therewith.

A second object of the present invention is to provide a foamed sole which is relatively light in weight and hardly undergoes thermal shrinkage and a shoe prepared therewith.

According to an assumption made by the present inventors, the cause of the thermal shrinkage of a foamed sole is considered to be as follows. In the present specification, "thermal shrinkage" means shrinking when heat is applied, and differs from the phenomenon of gradually shrinking spontaneously under ordinary temperature condition.

With regard to a foam molding containing a rubber component, the more it is allowed to highly foam, the more the rubber component is greatly stretched, and therefore, the force of going to return to the original state (shrinkage) is generated strongly. As such, a foam molding obtained by allowing a forming material containing the rubber component to highly foam tends to easily undergo thermal shrinkage. In addition, it is considered that in the case where a resin component is added to the forming material for a foam molding, thermal shrinkage thereof can be suppressed since the resin component resists shrinkage caused by the rubber component. In this connection, being allowed to highly foam mentioned above means being high in expansion ratio based on general foamed soles.

However, in the case where a forming material containing a rubber component and a resin component is allowed to highly foam, the resin component, as well as the rubber component, is greatly stretched. As such, in the case where the foam molding is heated, the rubber shrinkage inhibitory action which the resin component has is diminished since the stretched resin component also shrinks.

Based on such an assumption, the present inventors have obtained the findings that by using a forming material in which the stretched resin component and rubber component hardly shrink when exposed to a temperature within a prescribed range, a foamed sole which hardly undergoes thermal shrinkage can be constituted, and thus, the present invention has been completed.

The foamed sole according to the present invention includes a foam molding containing a rubber component and a resin component, the maximum value of a loss factor [tan δ] at a frequency of 10 Hz and at 30° C. to 80° C. of the foam molding is 0.18 or less, and a peak of a loss factor [tan δ] at a frequency of 10 Hz of the foam molding lies within the range of 100° C. or higher.

In the production of a general shoe, as described above, although a foamed sole is heated in the adhesion process, the temperature lies within the range of 60° C. to 80° C. Moreover, even when the shoe are exposed to a high temperature under a wearing environment of the shoe, the temperature lies within the range of 30° C. to 40° C. Therefore, a foamed sole which hardly undergoes thermal shrinkage in a temperature range of 30° C. to 80° C. is satisfactory in either of production and wear.

In this regard, the foamed sole according to the present invention is made of a foam molding in which the maximum value of a loss factor [tan δ] at a frequency of 10 Hz and at 30° C. to 80° C. is 0.18 or less.

The smaller the loss factor (loss factor=loss elastic modulus/storage elastic modulus) is, the smaller the loss elastic modulus with respect to the storage elastic modulus. Thus, with regard to the foam molding according to the present invention which has a small loss factor at 30° C. to 80° C., shrinkage caused by the stretched resin component and rubber component can be suppressed since the material itself hardly softens in the temperature range. With regard to the foamed sole according to the present invention which is made of the foam molding, thermal shrinkage, which is a problem caused under a wearing environment of the shoe or on production thereof, can be suppressed.

Moreover, the foamed sole according to the present invention is made of a foam molding in which a peak of the loss factor [tan δ] lies within the range of 100° C. or higher.

With regard to such a foam molding in which a peak of the loss factor lies within the range of 100° C. or higher, the deformation amount is large at the foam molding temperature (e.g. 150° C. to 170° C.), and it is possible to allow the foam molding to relatively largely foam. On the other hand, the foam molding, as described above, hardly undergoes thermal shrinkage after a foam molding treatment. Although the weight reduction and the thermal shrinkage inhibitory action which are in a trade-off relationship have hitherto been deemed to be common general technical knowledge of a person skilled in the art, according to the present invention, it is possible to provide a foamed sole which is relatively light in weight (is allowed to relatively highly foam) and hardly undergoes thermal shrinkage. For example, according to the present invention, it is also possible to provide a foamed sole made of a foam molding with a density of 0.6 g/cm$^3$ or lower.

In a preferred foamed sole according to the present invention, the foam molding contains a resin in which the lowest temperature among a glass transition point, a melting point, and a softening point of the resin is 90° C. or higher as the resin component.

In a further preferred foamed sole according to the present invention, the foam molding does not contain a resin in which the lowest temperature among a glass transition point, a melting point, and a softening point of the resin is lower than 75° C. as the resin component.

In a further preferred foamed sole according to the present invention, the loss factor [tan δ] at a frequency of 10 Hz and at 30° C. to 80° C. of the foam molding is 0.16 or less.

In a further preferred foamed sole according to the present invention, the loss factor [tan δ] at a frequency of 10 Hz and at 30° C. to 80° C. of the foam molding is 0.12 or more.

According to another aspect of the present invention, a shoe is provided.

The shoe according to the present invention is provided with any one of the foregoing foamed soles.

The foamed sole according to the present invention has a feature that it hardly shrinks when it is heated. Since the foamed sole hardly undergoes a dimensional change, for example, when it is adhered to a shoe body, it is possible to adhere the foamed sole to a prescribed position of the shoe body with precision.

Furthermore, according to the present invention, it is possible to provide a foamed sole which is relatively light in weight and hardly undergoes thermal shrinkage.

Moreover, the shoe according to the present invention hardly undergoes deformation even when exposed to a high temperature during wear, and is excellent in durability.

DESCRIPTION OF EMBODIMENTS

Figure 1:
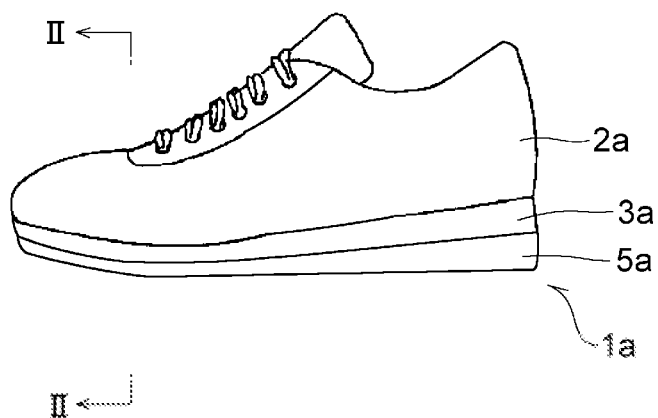
FIG. 1 is a side view illustrating a first embodiment of the shoe according to the present invention.

The foamed sole according to the present invention includes a foam molding containing a rubber component and a resin component, the maximum value of a loss factor [tan δ] at a frequency of 10 Hz and at 30° C. to 80° C. of the foam molding is 0.18 or less, and a peak of a loss factor [tan δ] at a frequency of 10 Hz thereof lies within the range of 100° C. or higher.

The foamed sole is obtained by forming a foam molding which is allowed to highly foam into a prescribed shape, and the density of the foam molding is, for example, 0.6 g/cm$^3$ or lower.

According to the present invention, even in such a foamed sole which is allowed to highly foam, thermal shrinkage thereof can be suppressed.

Hereinafter, a foamed sole according to the present invention is specifically described.

In the present specification, the wording "XXX to YYY" means that "XXX or higher and YYY or lower". In other words, it means "XXX or more and YYY or less"

[Use of the Foamed Sole According to the Present Invention]

For example, the foamed sole according to the present invention is used as an outer sole of a shoe, and is disposed on the lower surface of a shoe body. Moreover, the foamed sole according to the present invention is used as a midsole of a shoe, and for example, is disposed between a shoe body and an outer sole.

The foamed sole according to the present invention can be disposed on the whole lower surface of a shoe body. Moreover, the foamed sole may be disposed on a part of the lower surface of a shoe body.

Moreover, the foamed sole according to the present invention can be used not only as an outer sole and a midsole described above but also as a reinforcing member such as a shank member of a shoe. The shank member is a bottom member which is disposed to a plantar arch part.

The foamed sole is formed into an arbitrary shape. For example, the foamed sole is formed into a substantially plate-like shape, a substantially convex shape (e.g. a truncated cone-like shape, etc.), a plate-like shape on which a concave-convex shape is formed, or the like. The foamed sole according to the present invention is obtained by forming a foam molding into a prescribed shape according to the use thereof as a midsole, an outer sole, a shank member, or the like described above.

For example, the foamed sole can be fixedly disposed to a shoe body with an adhesive.

The adhesive is not particularly limited, and examples thereof include a conventionally known solvent-type adhesive, an emulsion-type adhesive, a laser adhesive, and a heat-sensitive adhesive. The solvent-type adhesive is an adhesive prepared by dissolving or dispersing a binder resin in an organic solvent, and the emulsion-type adhesive is an adhesive prepared by dispersing a binder resin in water. The laser adhesive is an adhesive which exhibits adhesive properties by being irradiated with laser light. The heat-sensitive adhesive is an adhesive which exhibits adhesive properties by being heated.

[Configuration and Use of the Shoe According to the Present Invention]

Figure 2:
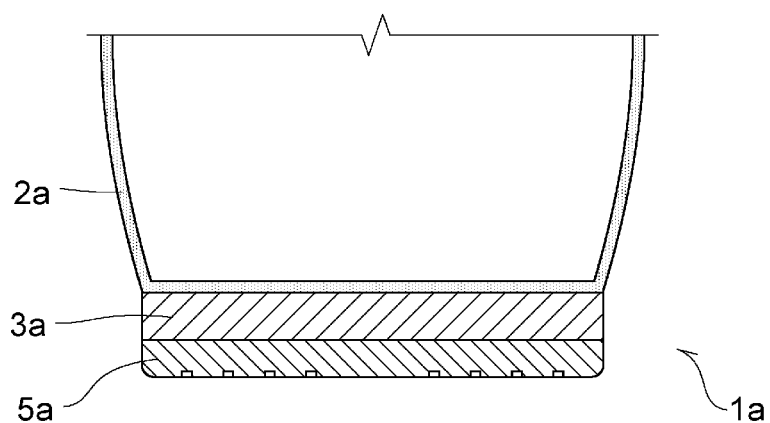
FIG. 2 is an enlarged II-II line sectional view of FIG. 1 and an enlarged sectional view omitting the upper part of the shoe body.

FIGS. 1 and 2 illustrate a first embodiment of the shoe according to the present invention.

This shoe 1a is provided with a shoe body 2a, a midsole 3a disposed on the lower surface of the shoe body 2a, and an outer sole 5a disposed on the lower surface of the midsole 3a. The midsole 3a is formed into a shape which is almost the same as that of the lower surface of the shoe body 2a, and the outer sole 5a is formed into a shape which is almost the same as that of the lower surface of the midsole 3a. As illustrated in FIG. 2, a desired concave-convex shape is formed on the lower surface of the outer sole 5a. Of course, the lower surface of the outer sole 5a may be formed into a flat shape (not illustrated).

The upper surface of the midsole 3a is adhered to the lower surface of the shoe body 2a with an adhesive, and the upper surface of the outer sole 5a is adhered to the lower surface of the midsole 3a with an adhesive (the adhesive is not illustrated). At the time of using the shoe 1a, the lower surface of the outer sole 5a makes contact with the ground.

The foamed sole according to the present invention is used as the outer sole 5a of the Shoe 1a. Alternatively, the foamed sole according to the present invention is used as the midsole 3a of the shoe 1a. Alternatively, the foamed soles according to the present invention each are used as the midsole 3a and the outer sole 5a of the shoe 1a.

Figure 3:
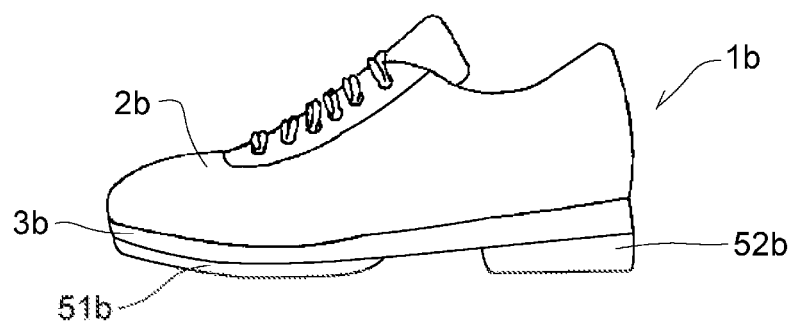
FIG. 3 is a side view illustrating a second embodiment of the shoe according to the present invention.

FIG. 3 illustrates a second embodiment of a shoe according to the present invention.

This shoe 1b is provided with a shoe body 2b, a midsole 3b disposed on the lower surface of the shoe body 2b, a first outer sole 51b disposed at the front side of the lower surface of the midsole 3b, and a second outer sole 52b disposed at the rear side of the lower surface of the midsole 3b. The midsole 3b is formed into a shape which is almost the same as that of the lower surface of the shoe body 2b, and each of the first outer sole 51b and the second outer sole 52b is formed into a shape which is smaller than that of the lower surface of the midsole 3b.

The upper surface of the midsole 3b is adhered to the lower surface of the shoe body 2b with an adhesive, and the upper surfaces of the first and second outer soles 51b, 52b each are adhered to the lower surface of the midsole 3b with an adhesive (the adhesive is not illustrated). At the time of using the shoe 1b, the lower surfaces of the first and second outer soles 51b, 52b each make contact with the ground, and a part of the lower surface of the midsole 3b may make contact with the ground.

The foamed sole according to the present invention is used as the first outer sole 51b and/or the second outer sole 52b of the shoe 1b. Alternatively, the foamed sole according to the present invention is used as the midsole 3b of the shoe 1b. Alternatively, the foamed soles according to the present invention each are used as the midsole 3b and the first and second outer soles 51b, 52b of the shoe 1b.

Each of the thicknesses of the midsoles 3a and 3b is not particularly limited. In order to impart the shoe with appropriate cushioning properties, each of the thicknesses of the midsoles 3a and 3b is, for example, 2 mm or more, preferably 2 mm to 10 mm.

Each of the thicknesses of the outer sole 5a, the first outer sole 51b, and the second outer sole 52b is not particularly limited. In order to impart the shoe with appropriate cushioning properties, each of the thicknesses of the outer sole 5a, the first outer sole 51b, and the second outer sole 52b is, for example, 2 mm or more, preferably 2 mm to 20 mm.

In this connection, the shoe according to the present invention may have not only a structure in which the shoe body protects almost the whole instep, as illustrated, but also such a structure in which a shoe body protects a part of the instep (e.g. a sandal, etc.).

The use of the shoe according to the present invention is not particularly limited. For example, the shoe according to the present invention can be used as shoes for various ball games such as soccer shoes and rugby shoes; shoes for running such as jogging shoes and marathon shoes; shoes for track and field events; a broad class of sports shoes; shoes for walking; beach sandals, and the like.

According to the present invention, it is possible to provide a foamed sole which has a relatively low density (that is, a foamed sole which is light in weight). The shoe according to the present invention which is provided with the foamed sole is satisfactory as shoes for ball games, shoes for running, shoes for track and field events, or shoes for walking.

[Features of Foam Molding (Foamed Sole)]

As described above, with regard to the foam molding according to the present invention, the maximum value of a loss factor [tan δ] at a frequency of 10 Hz and at 30° C. to 80° C. is 0.18 or less and a peak of a loss factor [tan δ] at a frequency of 10 Hz lies within the range of 100° C. or higher.

"The maximum value of a loss factor [tan δ] at a frequency of 10 Hz and at 30° C. to 80° C." mentioned above means the largest numerical value among loss factors obtained when those are measured at a frequency of 10 Hz and in the temperature range of 30° C. to 80° C.

"A peak of a loss factor [tan δ] at a frequency of 10 Hz lying within the range of 100° C. or higher" mentioned above means a peak of a curve (the top of an upward projecting curve), obtained when values of tan δ at each of the temperatures are plotted on a graph (a graph in which the tan δ is taken as the ordinate and the temperature is taken as the abscissa) and these points are connected as the curve, lying within the range of 100° C. or higher. In this connection, the peak is referred to also as the maximum value locally showing a large value. In the foam molding according to the present invention, a peak of tan δ and the maximum value of tan δ sometimes correspond to each other, and a peak and the maximum value sometimes do not correspond to each other. Moreover, in the foam molding according to the present invention, there is sometimes one peak of tan δ, and there are sometimes two or more peaks of tan δ, and in the case where there are two or more peaks of tan δ, at least one peak among them lies within the range of 100° C. or higher.

The loss factor [tan δ] is a value obtained by the dynamic viscoelasticity measurement and determined from the equation of loss factor [tan δ]=loss elastic modulus [E"]/storage elastic modulus [E']. For the specific description of the measuring method, see Examples described below.

The maximum value of a loss factor at a frequency of 10 Hz and at 30° C. to 80° C. of the foam molding is preferably 0.16 or less, more preferably 0.155 or less.

The theoretical lower limit of the maximum value of a loss factor at a frequency of 10 Hz and at 30° C. to 80° C. of the foam molding is zero. Of course, it is not realistic that the maximum value of a loss factor at 30° C. to 80° C. is zero, and for example, the maximum value of a loss factor at 30° C. to 80° C. is 0.05 or more, preferably 0.12 or more, and more preferably 0.13 or more.

The foam molding has a loss factor (loss factor=loss elastic modulus/storage elastic modulus) at 30° C. to 80° C.

of 0.18 or less, which is relatively small, and the loss elastic modulus is small with respect to the storage elastic modulus. The foam molding hardly undergoes thermal shrinkage in the temperature range of 30° C. to 80° C. since the material itself hardly softens in the temperature range.

Moreover, with regard to the foam molding, a peak of the loss factor lies within the range of 100° C. or higher. Since the foam molding is made of a forming material in a softened state at 100° C. or higher, the deformation amount is large at a temperature at which the material is allowed to foam (e.g. 150° C. to 170° C.), and it is possible to allow the material to relatively largely foam. Although it has hitherto been easy to obtain a foam molding which is allowed to highly foam, a foamed sole which is allowed to highly foam and hardly undergoes thermal shrinkage has not yet been made into a product since the more the expansion ratio is increased, the more the foam molding undergoes thermal shrinkage. According to the present invention, it is possible to provide a foam molding which hardly undergoes thermal shrinkage even when exposed to a temperature in the range of 30° C. to 80° C. after a foam molding treatment, and is allowed to relatively highly foam.

[Forming Material for Foam Molding (Foamed Sole)]

The foam molding (the foamed sole) according to the present invention can be obtained by foam-molding a forming material containing a resin component and a rubber component.

The forming material for the foam molding (the foamed sole) according to the present invention may contain other components as long as it contains the resin component and the rubber component.

In the present specification, a resin component refers to a polymer with a glass transition point of 0° C. or higher, and a rubber component refers to a polymer with a glass transition point lower than 0° C.

The material of the resin component is not particularly limited.

Examples of the material of the resin component include styrene-based resins such as polystyrene, a styrene-butadiene resin, an acrylonitrile-styrene resin (an AS resin), and an acrylonitrile-butadiene-styrene resin (an ABS resin); olefin-based resins such as low density polyethylene, high density polyethylene, and polypropylene; α-olefin-based resins such as an ethylene-α-olefin copolymer and an ethylene-butene copolymer; ester-based resins such as polyethylene terephthalate and polybutylene terephthalate; amide-based resins such as 6-nylon; vinyl chloride-based resins; acrylic resins such as polymethyl methacrylate; vinyl acetate-based resins such as an ethylene-vinyl acetate copolymer (EVA); and polybutadiene-based thermoplastic resins such as syndiotactic 1,2-polybutadiene. These thermoplastic resins may be used alone or in combination of two or more thereof.

Since thermal shrinkage caused by the rubber component in a foam molding can be effectively suppressed, as the material of the resin component, a styrene-based resin is preferred and a styrene-butadiene resin is more preferred. In this connection, it is also preferred that the foam molding further contain other kinds of resins as long as it contains a styrene-based resin.

Although the amount of styrene contained in the styrene-based resin is not particularly limited, the amount is preferably 70% by mass or more, and more preferably 75% by mass or more. By employing a styrene-based resin which is large in amount of styrene, thermal shrinkage of the foam molding can be effectively suppressed.

Moreover, it is preferred that the foam molding contains a resin in which the lowest temperature among the glass transition point, the melting point, and the softening point of the resin is 90° C. or higher as the resin component, and furthermore, it is more preferred that the foam molding contains a resin in which the lowest temperature among the glass transition point, melting point, and softening point of the resin is 100° C. or higher. The softening point refers to the Vicat softening point.

Hereinafter, "a resin in which the lowest temperature among the glass transition point, the melting point, and the softening point of the resin is 90° C. or higher" is sometimes referred to as "a resin of 90° C. or higher."

Since the resin of 90° C. or higher does not soften at 80° C. or lower, shrinkage caused by the stretched rubber component can be effectively suppressed.

In this context, the reason why the temperature is prescribed as a lowest temperature among the glass transition point, the melting point, and the softening point is that there is a resin which does not show a definite melting point or the like depending on the kind of the resin. Therefore, in the present specification, "a resin in which the lowest temperature among the glass transition point, the melting point, and the softening point is 90° C. or higher" means a resin in which at least any one of the glass transition point, melting point, and softening point is measurable and the lowest temperature among the measurable temperatures (in the case where there is one measurable temperature, the same temperature) is 90° C. or higher. This concept holds true for the following resin in which the lowest temperature among the glass transition point, melting point, and softening point is lower than 75° C.

In the case where the resin of 90° C. or higher shows a melting point, it is preferred that the melting point of the resin of 90° C. or higher be 150° C. or lower. Although the forming materials (a rubber component, a resin component, etc.) for a foam molding are melted by heating and mixed on molding, with regard to a resin showing a melting point higher than 150° C., there is a possibility that the resin is not melted well at the mixing temperature.

As the resin component, one kind of the resin of 90° C. or higher may be used alone, or two or more kinds of the resins of 90° C. or higher may be used in combination. Alternatively, as the resin component, one or more kinds of the resins of 90° C. or higher and one or more kinds of the resins in which the lowest temperature among the glass transition point, the melting point, and the softening point is lower than 90° C. may be used in combination.

It is preferred that the resin component do not contain the resin in which the lowest temperature among the glass transition point, the melting point, and the softening point of the resin is lower than 75° C., it is more preferred that the resin component do not contain the resin in which the lowest temperature among the glass transition point, the melting point, and the softening point of the resin is lower than 80° C., and it is more preferred that the resin component do not contain the resin in which the lowest temperature among the glass transition point, melting point, and softening point is lower than 90° C.

Hereinafter, "a resin in which the lowest temperature among the glass transition point, the melting point, and the softening point of the resin is lower than 75° C." is sometimes referred to as "a resin of lower than 75° C.".

Since the resin lower than 75° C. softens at 80° C. or lower, the inhibitory effect on shrinkage caused by the rubber component is hardly exerted in the temperature range of 30° C. to 80° C. Furthermore, the stretched resin lower than 75° C. shrinks by heating, and on the contrary, there is a possibility that the shrinkage of the resin lower than 75° C.

impairs the inhibitory effect on shrinkage caused by the rubber component which the resin of 90° C. or higher has.

Although examples of the resin component include those mentioned above, the foam molding may contain a resin other than those mentioned above as long as the effect of the present invention is not impaired.

The amount of the resin component blended is appropriately designed so that a foam molding in which the loss factor satisfies the above-mentioned requirements is obtained.

For example, the amount of the resin component blended is 10 parts by mass to 100 parts by mass, preferably 20 parts by mass to 90 parts by mass, and more preferably 25 parts by mass to 85 parts by mass, relative to 100 parts by mass of the rubber component.

In particular, in the foam molding according to the present invention, the amount of the resin of 90° C. or higher blended is preferably 15 parts by mass to 80 parts by mass and more preferably 20 parts by mass to 70 parts by mass, relative to 100 parts by mass of the rubber component.

The material of the rubber component is not particularly limited, and in general, examples thereof include rubbers and thermoplastic elastomers.

Examples of the kind of the rubber include synthetic rubbers such as a butadiene rubber (BR), an isoprene rubber (IR), and a chloroprene rubber (CR); natural rubbers (NR); and copolymer rubbers such as a styrene-butadiene rubber (SBR), an acrylonitrile-butadiene rubber (NBR), and a butyl rubber (IIR).

Examples of the kind of the thermoplastic elastomer include an ethylene-vinyl acetate copolymer-based elastomer; an olefin-based elastomer; styrene-based elastomers such as a styrene-butadiene-styrene copolymer (SBS) and a styrene-ethylene-butylene-styrene block copolymer (SEBS); urethane-based elastomers; ester-based elastomers; fluorine-based elastomers; silicone-based elastomers; and polyamide-based elastomers. These may be used alone or in combination of two or more thereof.

As the rubber component, a diene-based rubber is preferably used, and at least one selected from the group consisting of a butadiene rubber, an isoprene rubber, a styrene-butadiene rubber, and a natural rubber is more preferably used. A foam molding obtained from the forming material containing such a rubber component is excellent in elasticity.

Examples of the other components include a foaming agent, a reinforcing agent, a vulcanizing agent, and various other additives.

Since the foam molding according to the present invention is usually produced by a chemical foaming method, an appropriate foaming agent is contained in the forming material.

The foaming agent is not particularly limited, and a conventionally known one may be used.

Examples of the foaming agent include sodium bicarbonate, ammonium bicarbonate, sodium carbonate, ammonium carbonate, azodicarbonamide (ADCA), dinitrosopentamethylenetetramine (DNPT), azobisisobutyronitrile, barium azodicarboxylate, and p,p'-oxybisbenzene sulfonylhydrazine (OBSH).

In order to accelerate the foaming, a foaming aid may be used together with the foaming agent. Examples of the foaming aid include urea and a urea derivative.

The amount of the foaming agent blended is not particularly limited and is appropriately designed. For example, the amount of the foaming agent blended is 1 part by mass to 20 parts by mass relative to 100 parts by mass of the rubber component.

The reinforcing agent is not particularly limited, and a conventionally known one may be used.

Examples of the reinforcing agent include silica, carbon black, activated calcium carbonate, and ultrafine magnesium silicate particles.

Hydrous silica (white carbon) is preferably used as the reinforcing agent, since a foam molding which has a relatively low density, high mechanical strength, and high abrasion resistance even when it is slightly foamed can be obtained.

The amount of the reinforcing agent blended is not particularly limited and is appropriately designed. For example, the amount of the reinforcing agent blended is 10 parts by mass to 40 parts by mass relative to 100 parts by mass of the rubber component.

The vulcanizing agent is not particularly limited, and a conventionally known one may be used.

Examples of the vulcanizing agent include sulfur; compounds such as a disulfide which generates sulfur by heating; organic peroxides; and metal oxides such as magnesium oxide.

In order to accelerate the vulcanization, a vulcanization accelerator may be used together with the vulcanizing agent. Examples of the vulcanization accelerator include aldehyde, ammonia, amine, guanidine, thiourea, thiazole, thiuram, dithiocarbamate, and xanthate vulcanization accelerators.

The amount of the vulcanizing agent blended is not particularly limited and is appropriately designed. For example, the amount of the vulcanizing agent blended is 0.1 parts by mass to 5 parts by mass relative to 100 parts by mass of the rubber component.

Examples of the additive include a heat stabilizer, a light stabilizer, an antioxidant, an ultraviolet ray absorber, a coloring agent, a plasticizer, an antistatic agent, a thickening agent, a process oil, and stearic acid.

[Production of Foam Molding (Foamed Sole)]

A forming material containing the resin component and the rubber component is foam-molded.

Specifically, prescribed amounts of the resin component, the rubber component, and other components including the foaming agent, the vulcanizing agent, the reinforcing agent, and the additives which are added as necessary are blended, and this is kneaded with a mixing roll, a pressurizing kneader, an extruder, or the like while being heated to 100° C. to 150° C.

The forming material thoroughly kneaded is charged into a press mold, and for example, the forming material is pressed for a prescribed time while being heated to 150° C. to 170° C. to vulcanize the rubber component and allow the foaming agent to foam.

Although the expansion ratio is not particularly limited, the ratio is, for example, 1.05 times to 1.4 times, preferably 1.05 times to 1.2 times.

From the viewpoint of weight reduction, the density of the foamed sole is preferably 0.6 g/cm$^3$ or lower, more preferably 0.55 g/cm$^3$ or lower, and further preferably 0.5 g/cm$^3$ or lower. Moreover, although it is preferred that the lower limit of the density of the foamed sole be as low as possible, the density of the foamed sole is generally 0.2 g/cm$^3$ or higher, preferably 0.3 g/cm$^3$ or higher.

In this way, a foam molding can be obtained. Secondary processing is performed so that the shape of the foam molding obtained is adapted to a shape of a constituting member of a shoe such as an outer sole, and thus, the foamed sole according to the present invention can be obtained.

Moreover, in the case where the shape of the mold is formed in a shape of a constituting member of a shoe such as an outer sole, the foam molding obtained can be used directly as the foamed sole according to the present invention.

The foamed sole obtained is adhered to a shoe body with an adhesive.

In the case where a solvent-type adhesive or an emulsion-type adhesive is used as the adhesive, for example, the foamed sole is exposed to hot air of 60° C. to 80° C. to dry the adhesive. In the case where a laser adhesive or a heat-sensitive adhesive is used as the adhesive, the foamed sole is adhered with the adhesive in a state of being melted by heating with a laser or a heating apparatus.

Since the foamed sole according to the present invention hardly undergoes thermal shrinkage in the temperature range of 30° C. to 80° C., the foamed sole hardly undergoes a dimensional change even when exposed to hot air of 60° C. to 80° C. as described above. Moreover, in the case where a laser adhesive or a heat-sensitive adhesive is used, heat of the adhesive is transmitted to the foamed sole. Since the foamed sole according to the present invention hardly undergoes thermal shrinkage in the temperature range of 30° C. to 80° C., the foamed sole hardly undergoes a dimensional change even when heat is transmitted from the laser adhesive or the like thereto.

As such, it is possible to adhere the foamed sole to a shoe body with precision.

EXAMPLES

Hereinafter, the present invention will be described in more detail with reference to Examples and Comparative Examples. However, the present invention is not limited to the following Examples.

[Materials Used in Examples and Comparative Examples]
[Resin Component]

Resin (1): Styrene-butadiene resin. The amount of styrene is 77% by mass. The glass transition point is 111° C. The MFR is 6.0 (200° C., 49N).

Resin (2): Styrene-butadiene resin. The amount of styrene is approximately 80% by mass. The vicat softening point is 92° C. The MFR is 11.0 (200° C., 49N).

Resin (3): Low density polyethylene. The density is 0.92. The melting point is 108° C. The MFR is 2.17 (190° C., 49N).

Resin (4): α-Olefin copolymer (ethylene-butene copolymer). The melting point is 94° C. The MFR is 1.2 (190° C., 49N).

Resin (5): Syndiotactic 1,2-polybutadiene. The content of 1,2-bond is 92%. The melting point is 95° C. The MFR is 3.0 (150° C., 49N).

Resin (6): Syndiotactic 1,2-polybutadiene. The content of 1,2-bond is 93%. The melting point is 105° C. The MFR is 3.0 (150° C., 49N).

Resin (7): Styrene-butadiene resin. The amount of styrene is 68% by mass. The glass transition point is 73° C. The Mooney viscosity $ML_{1+4}$ (100° C.) is 62.

Resin (8): Styrene-butadiene resin. The amount of styrene is 65% by mass. The glass transition point is 59° C. The MFR is 17.0 (200° C., 49N).

Resin (9): α-Olefin copolymer (ethylene-butene copolymer). The melting point is 66° C. The MFR is 1.2 (190° C., 49N).

In this context, each of the foregoing temperatures of Resins (1) to (9) is the lowest temperature among the glass transition point, the melting point, and the Vicat softening point. In this connection, not all of the temperatures of the glass transition point, melting point, and Vicat softening point were measured completely, and there are some resins for which one or two temperatures among them were not measured. On that account, with regard to a resin for which only one temperature of the glass transition point, melting point, and Vicat softening point was measured, the temperature is expressed as the foregoing temperature.

The glass transition point was measured using a dynamic viscoelasticity measuring apparatus (manufactured by UBM CO., LTD., product name "Rheogel-E4000") in accordance with JIS K 7244-4.

The melting point was measured in accordance with JIS K 7121 (Testing Methods for Transition Temperatures of Plastics).

The Vicat softening point was measured in accordance with JIS K 7206 (Plastics-Thermoplastic materials-Determination of Vicat softening temperature (VST)).

The MFR was measured in accordance with JIS K 7210 (Plastics-Determination of the melt mass-flow rate (MFR) and the melt volume-flow rate (MVR) of thermoplastics).

The Mooney viscosity was measured in accordance with JIS K 6300-1 (Rubber, unvulcanized-Physical property-Part 1: Determination of Mooney viscosity and pre-vulcanization characteristics with Mooney viscometer).

[Rubber Component]

Rubber (1): Styrene-butadiene rubber (SBR). The amount of styrene is 45% by mass. The Mooney viscosity $ML_{1+4}$ (100° C.) is 44. The specific gravity is 0.95.

Rubber (2): Styrene-butadiene rubber (SBR). The amount of styrene is 21% by mass. The Mooney viscosity $ML_{1+4}$ (100° C.) is 45. The specific gravity is 0.93.

Rubber (3): Styrene-butadiene rubber (SBR). The amount of styrene is 39% by mass. The Mooney viscosity $ML_{1+4}$ (100° C.) is 72. The specific gravity is 0.96.

Rubber (4): Butadiene rubber (BR). The Mooney viscosity $ML_{1+4}$ (100° C.) is 43. The specific gravity is 0.90.

Rubber (5): Isoprene rubber (IR). The Mooney viscosity $ML_{1+4}$ (100° C.) is 82. The specific gravity is 0.91.

Rubber (6): Acrylonitrile-butadiene rubber (NBR). The amount of acrylonitrile is 35% by mass. The Mooney viscosity $ML_{1+4}$ (100° C.) is 42. The specific gravity is 0.98.

Rubber (7): Epoxidized natural rubber. The epoxidation ratio is 50% by mass.

Reinforcing agent: Hydrous silica.

Additive: Vulcanizing agent, vulcanization accelerator, plasticizer and the like.

Foaming agent: Foaming agent and foaming aid.

Example 1

A resin component, a rubber component, a reinforcing agent, and an additive were blended in the proportion shown in Table 1. These materials were kneaded using a pressure type kneader and a mixing roll, the mixture was charged into a press mold, and the mixture was pressed for a prescribed time while being heated to 150° C. to 170° C. to prepare a foam molding having a rectangular parallelepiped shape of 187 mm in longitudinal length by 187 mm in lateral length by about 5 mm in thickness.

In this context, in Tables 1 and 2, the unit for each of the numerical values of resin components and rubber components is part by mass. In Tables 1 and 2, "Rubber proportion" refers to % by mass of the rubber component relative to the whole amount of forming materials, and "Resin/rubber" refers to (the total mass of the resin components)/(the total mass of the rubber components).

TABLE 1

| | Example 1 | Example 2 | Example 3 | Example 4 | Example 5 | Example 6 | Example 7 | Example 8 |
|---|---|---|---|---|---|---|---|---|
| Resin (1) | 13 | 15 | 15 | 15 | 22 | | 15 | |
| Resin (2) | | | | | | 22 | | |
| Resin (3) | 12 | | | 10 | 5 | 5 | 10 | |
| Resin (4) | | 15 | 13 | | | | | 20 |
| Resin (5) | | | | | | | | |
| Resin (6) | | | | | 10 | 10 | 20 | |
| Resin (7) | | | | | | | | 17 |
| Resin (8) | | | | | | | | |
| Resin (9) | | | | | | | | |
| Rubber (1) | 30 | | | | | | | |
| Rubber (2) | | 20 | | | | | | |
| Rubber (3) | | | 20 | | | | | |
| Rubber (4) | 33 | 38 | 40 | 43 | 48 | 48 | 43 | 48 |
| Rubber (5) | 12 | 12 | 12 | 12 | 10 | 10 | 12 | 5 |
| Rubber (6) | | | | 20 | 5 | 5 | | |
| Rubber (7) | | | | | | | | 10 |
| Reinforcing agent | 20 | 20 | 20 | 20 | 20 | 20 | 20 | 20 |
| Additive | 11 | 11 | 11 | 11 | 11 | 11 | 11 | 17 |
| Foaming agent | 8 | 8 | 8 | 8 | 8 | 7 | 7 | 8 |
| Total | 139 | 139 | 139 | 139 | 139 | 138 | 138 | 145 |
| Rubber proportion | 54.0 | 50.4 | 51.8 | 54.0 | 45.3 | 45.7 | 39.9 | 43.4 |
| Resin/Rubber | 0.33 | 0.43 | 0.35 | 0.33 | 0.59 | 0.59 | 0.82 | 0.59 |

Examples 2 to 81

A foam molding was prepared in the same manner as that in Example 1 except that materials were blended in each proportion for Examples 2 to 8 shown in Table 1.

Comparative Examples 1 to 5

A foam molding was prepared in the same manner as that in Example 1 except that materials were blended in each proportion for Comparative Examples 1 to 5 shown in Table 2.

In this connection, although the preparation of a foam molding containing a rubber component and a resin component, allowing the maximum value of a loss factor [tan δ] at a frequency of 10 Hz and at 30° C. to 80° C. to be 0.18 or less, and allowing a peak of a loss factor [tan δ] at a frequency of 10 Hz to lie within the range lower than 100° C. was attempted, it failed.

In the case of the composition containing a rubber component as a polymer (not containing a resin component), it is possible to obtain a foam molding allowing the maximum value of a loss factor at 30° C. to 80° C. to be 0.18 or less and allowing a peak of the loss factor to lie within the range lower than 100° C. However, with regard to such a foam molding, due to the amount of the rubber component, the force of going to return to the original state after molding is strong, and it is difficult to obtain a foam molding allowing the density to be 0.6 g/cm³ or lower.

TABLE 2

| | Comparative Example 1 | Comparative Example 2 | Comparative Example 3 | Comparative Example 4 | Comparative Example 5 |
|---|---|---|---|---|---|
| Resin (1) | | | | | |
| Resin (2) | | | | | |
| Resin (3) | | | | | |
| Resin (4) | | | | | |
| Resin (5) | | 10 | 20 | | |
| Resin (6) | 20 | | | | |
| Resin (7) | 17 | 27 | 17 | 17 | 17 |
| Resin (8) | | | | 20 | |
| Resin (9) | | | | | 20 |
| Rubber (1) | | | | | |
| Rubber (2) | | | | | |
| Rubber (3) | | | | | |
| Rubber (4) | 53 | 48 | 48 | 48 | 48 |
| Rubber (5) | 10 | 5 | 5 | 5 | 5 |
| Rubber (6) | | | | | |
| Rubber (7) | | 10 | 10 | 10 | 10 |
| Reinforcing agent | 20 | 20 | 20 | 20 | 20 |
| Additive | 11 | 17 | 17 | 17 | 17 |
| Foaming agent | 8 | 8 | 8 | 8 | 8 |
| Total | 139 | 145 | 145 | 145 | 145 |
| Rubber proportion | 45.3 | 43.4 | 43.4 | 43.4 | 43.4 |
| Resin/Rubber | 0.59 | 0.59 | 0.59 | 0.59 | 0.59 |

[Measurement of Loss Factor]

With regard to each of foam moldings in the foregoing Examples and Comparative Examples, the loss factor [tan δ] was determined under the following measurement conditions in accordance with JIS K7244. From the measurement result, the temperature of a peak of a loss factor [tan δ] and the maximum value of a loss factor [tan δ] at 30° C. to 80° C. were determined and those are shown in Table 3.

Measuring instrument: Dynamic viscoelasticity measuring apparatus
Rheogel-E4000 manufactured by UBM CO., LTD.
Sample shape: Strip-like shape of 33±3 mm in length, 5±0.3 mm in width and 2±0.3 mm in thickness.
Measurement mode: Tension mode of sine wave distortion.
Distance between chucks: 20±0.2 mm.
Temperature: Intervals of 3° C. within the range of −100° C. to 150° C.

Frequency: 10 Hz.
Load: Automatic static load.
Dynamic distortion: 3 to 5 μm.

TABLE 3

|  | Peak temperature of 100° C. or more and its value of tan δ | | Maximum value of tan δ | | Contraction | |
|---|---|---|---|---|---|---|
|  | Peak temperature (° C.) | Peak value of tan δ | at 30° C. to 80° C. | Density (g/cm³) | width caused by heat (mm) | Abrasion resistance |
| Example 1 | 113 | 0.151 | 0.153 | 0.50 | 0.0 | 304 |
| Example 2 | 104 | 0.212 | 0.135 | 0.49 | 0.5 | — |
| Example 3 | 105 | 0.214 | 0.133 | 0.50 | 1.0 | 320 |
| Example 4 | 101 | 0.165 | 0.156 | 0.50 | 1.0 | 254 |
| Example 5 | 102 | 0.220 | 0.165 | 0.50 | 1.5 | 234 |
| Example 6 | 117 | 0.335 | 0.146 | 0.48 | 0.5 | 272 |
| Example 7 | 113 | 0.193 | 0.128 | 0.49 | 0.5 | 315 |
| Example 8 | 111 | 0.176 | 0.178 | 0.50 | 1.5 | — |
| Comparative Example 1 | — | — | 0.183 | 0.48 | 3.5 | 236 |
| Comparative Example 2 | — | — | 0.267 | 0.50 | 4.0 | 254 |
| Comparative Example 3 | — | — | 0.194 | 0.49 | 2.5 | 276 |
| Comparative Example 4 | — | — | 0.368 | — | 5.0 | — |
| Comparative Example 5 | — | — | 0.279 | 0.50 | 3.0 | — |

[Method of Measuring Density]

With regard to each of foam moldings in the foregoing Examples and Comparative Examples, the density was measured in accordance with JIS K 6268.

Specifically, a foam molding was cut into a size of about 15 mm in longitudinal length by 40 mm in lateral length by 3 mm in height to obtain a test specimen, and the density was calculated by measuring the mass in the atmosphere of the test specimen and the underwater mass thereof respectively with an electronic balance and substituting those into the following equation.

$$D = W_1 / (W_1 - W_2)$$

D: Density
$W_1$: Mass in atmosphere of test specimen
$W_2$: Underwater mass of test specimen The results are shown in Table 3. In this context, with regard to Comparative Example 4, the density was not measured.

[Test for Thermal Shrinkage]

Each of foam moldedings in the foregoing Examples and Comparative Examples was tested for the degree of thermal shrinkage.

Specifically, a foam molding (a foam molding having a rectangular parallelepiped shape of 187 mm in longitudinal length by 187 mm in lateral length by about 5 mm in thickness) removed from the mold was allowed to spontaneously cool under room temperature condition. The foam molding was placed in an oven with a temperature adjusting function, heated for 10 minutes at 60° C., and allowed to stand for 2 days at ordinary temperature. Furthermore, the foam molding was placed in the oven and heated for 10 minutes at 80° C. After heating was performed at 80° C., the foam molding was allowed to stand at ordinary temperature for 2 days, and then, the longitudinal length of the foam molding was measured. The difference between the length of the foam molding before heated at 60° C. and that of the foam molding after heated at 80° C. and then allowed to stand for 2 days is defined as the contraction width caused by heat (mm).

Contraction width caused by heat (mm)=the longitudinal length of the foam molding before heated at 60° C. (187 mm)–the longitudinal length of the foam molding after heated at 60° C. and 80° C. and then allowed to stand for 2 days.

[Test for Abrasion Resistance]

Each of foam moldings in the foregoing Examples and Comparative Examples was tested for the degree of abrasion resistance using a DIN abrasion testing machine in accordance with JIS K6264-2. The results are shown in Table 3. In this context, with regard to Examples 2 and 8 and Comparative Examples 4 and 5, the test for abrasion resistance was not performed.

Testing method: Method B (Method of testing the test specimen while rotating it).
Sample shape: Columnar shape of 16.0±0.2 mm in diameter and 12 mm in thickness.
Applied load: 10.0±0.2 N.
Abrasion distance: 40.0±0.2 m.
Drum rotating speed: 40±1 rotations/minute.
Laterally sending speed: 4.20±0.04 mm/one rotation of the drum.

[Evaluation]

From Table 3, each of the foam moldings in Examples 1 to 8 in which the maximum value of a loss factor [tan δ] at 30° C. to 80° C. is 0.178 or less hardly underwent thermal shrinkage, and each of the foam moldings in Comparative Examples 1 to 5 in which the maximum value of a loss factor [tan δ] at 30° C. to 80° C. is 0.183 or more easily underwent thermal shrinkage. This reveals that the foam moldings in which the maximum value of a loss factor [tan δ] at 30° C. to 80° C. is 0.18 or less can suppress thermal shrinkage.

In particular, with regard to the foam moldings in Examples 1 to 4 and Examples 6 and 7 in which the maximum value of a loss factor [tan δ] at 30° C. to 80° C. is 0.16 or less, the degree of thermal shrinkage is small and they are more excellent than others.

INDUSTRIAL APPLICABILITY

A foamed sole according to the present invention can be used as a constituting member of a shoe.

1a, 1b Shoe
2a, 2b Shoe body
3a, 3b Midsole
5a, 51b, 52b Outer sole

What is claimed is:

1. A foamed sole comprising:
    a foam molding containing a rubber component and a resin component,
    the rubber component being a polymer with a glass transition point of lower than 0° C.,
    the resin component being another polymer with a glass transition point of 0° C. or higher,
    the foam molding containing 20 parts by mass to 90 parts by mass of the resin component relative to 100 parts by mass of the rubber component, and
    the resin component comprising a styrene-based resin that contains 70% by mass or more of styrene,
    wherein the maximum value of a loss factor [tan δ] at a frequency of 10 Hz and at 30° C. to 80° C. of the foam molding is 0.18 or less, and a peak of a loss factor [tan δ] at a frequency of 10 Hz of the foam molding lies within the range of 100° C. or higher,
    wherein the rubber component comprises at least one selected from the group consisting of a butadiene rubber, an isoprene rubber, a chloroprene rubber, natural rubbers, a styrene-butadiene rubber, an acrylonitrile-butadiene rubber, and a butyl rubber, and
    wherein the foam molding is absent a resin showing a melting point higher than 150° C.

2. The foamed sole according to claim 1, wherein a density of the foam molding is 0.2 g/cm³ to 0.6 g/cm³.

3. The foamed sole according to claim 1, wherein a lowest temperature among a glass transition point, a melting point, and a softening point of the styrene-based resin is from 90° C. to 150° C.

4. The foamed sole according to claim 3, wherein the foam molding contains a resin different from the styrene-based resin, in which a lowest temperature among a glass transition point, a melting point, and a softening point of the different resin is from 90° C. to 150° C.

5. The foamed sole according to claim 1, wherein the foam molding does not contain a resin in which the lowest temperature among a glass transition point, a melting point, and a softening point of the resin is lower than 75° C. as the resin component.

6. The foamed sole according to claim 1, wherein the loss factor [tan δ] at a frequency of 10 Hz and at 30° C. to 80° C. of the foam molding is 0.16 or less.

7. The foamed sole according to claim 1, wherein the loss factor [tan δ] at a frequency of 10 Hz and at 30° C. to 80° C. of the foam molding is 0.12 or more.

8. A shoe comprising the foamed sole according to claim 1.

9. The foamed sole according to claim 1, wherein the loss factor [tan δ] at a frequency of 10 Hz and at 30° C. to 80° C. of the foam molding is between 0.12 and 0.16.

10. The foamed sole according to claim 1, wherein an amount of the resin component is from 15 parts by mass to 80 parts by mass, relative to 100 parts by mass of the rubber component.

11. The foamed sole according to claim 1, wherein an amount of the resin component is from 20 parts by mass to 70 parts by mass, relative to 100 parts by mass of the rubber component.

12. The foamed sole according to claim 1, wherein the rubber component comprises at least one selected from the group consisting of a butadiene rubber, an isoprene rubber, a styrene-butadiene rubber, and natural rubbers.

* * * * *